United States Patent
Posseme et al.

(10) Patent No.: US 12,087,707 B2
(45) Date of Patent: Sep. 10, 2024

(54) METHOD OF MAKING AN INDIVIDUALIZATION ZONE OF AN INTEGRATED CIRCUIT

(71) Applicant: COMMISSARIAT A L'ENERGIE ATOMIQUE ET AUX ENERGIES ALTERNATIVES, Paris (FR)

(72) Inventors: Nicolas Posseme, Grenoble (FR); Stefan Landis, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 393 days.

(21) Appl. No.: 17/443,138

(22) Filed: Jul. 21, 2021

(65) Prior Publication Data
US 2022/0028803 A1    Jan. 27, 2022

(30) Foreign Application Priority Data

Jul. 22, 2020  (FR) ..................................... 20 07718

(51) Int. Cl.
*H01L 23/00*  (2006.01)
*H01L 21/311*  (2006.01)
(Continued)

(52) U.S. Cl.
CPC ...... *H01L 23/573* (2013.01); *H01L 21/31116* (2013.01); *H01L 21/31144* (2013.01);
(Continued)

(58) Field of Classification Search
CPC .............. H01L 23/5226; H01L 23/573; H01L 21/31116; H01L 21/31144; H01L 21/76802; H01L 21/76877
See application file for complete search history.

(56) References Cited

U.S. PATENT DOCUMENTS

2003/0211725 A1* 11/2003 Chung .............. H01L 21/76813
                                                                438/630
2007/0269907 A1    11/2007 Chi et al.
(Continued)

FOREIGN PATENT DOCUMENTS

EP            2 750 169 A2    7/2014
EP            2 750 169 A3    7/2014
WO       WO 2018/175973 A1    9/2018

OTHER PUBLICATIONS

Posseme et al., "Residue growth on metallic-hard mask after dielectric etching in fluorocarbon-based plasmas. I. Mechanisms", 2010, J. Vac. Sci. Technol., B 28, 809-816 (Year: 2010).*
(Continued)

*Primary Examiner* — Nicholas J Tobergte
*Assistant Examiner* — Adin Hrnjic
(74) *Attorney, Agent, or Firm* — Oblon, McClelland, Maier & Neustadt, L.L.P.

(57) ABSTRACT

A method for making an individualization zone of a microchip comprising a first level and a second level of electrical tracks, and a level of interconnections comprising vias. The method includes: providing the first level and a dielectric layer, making a hard metal mask on the dielectric layer, etching the dielectric layer through the mask openings by etching based on fluorinated chemistry, preferably oxidizing the hard metal mask by hydrolysis so as to form randomly distributed residues at certain openings, and filling the openings so as to form at least the vias of the level of interconnections, the vias comprising functional vias at the openings without residues and inactive vias at the openings with residues.

11 Claims, 8 Drawing Sheets

(51) Int. Cl.
   *H01L 21/768*   (2006.01)
   *H01L 23/522*   (2006.01)
(52) U.S. Cl.
   CPC .. *H01L 21/76802* (2013.01); *H01L 21/76877* (2013.01); *H01L 23/5226* (2013.01)

(56) References Cited

U.S. PATENT DOCUMENTS

| | | |
|---|---|---|
| 2013/0241079 A1 | 9/2013 | Chi et al. |
| 2014/0187035 A1 | 7/2014 | Posseme et al. |
| 2015/0011086 A1 | 1/2015 | Chi et al. |
| 2015/0270163 A1* | 9/2015 | Posseme ........... H01L 21/31144 438/618 |
| 2016/0254227 A1 | 9/2016 | Leobandung |
| 2016/0254235 A1 | 9/2016 | Leobandung |
| 2020/0381372 A1 | 12/2020 | Kozicki et al. |
| 2021/0305499 A1* | 9/2021 | Xie ........................ H10N 50/10 |

OTHER PUBLICATIONS

French Preliminary Search Report issued Apr. 23, 2021 in French Application 20 07718 filed on Jul. 22, 2020, 10 pages (with English Translation of Categories of Cited Documents & Written Opinion).
Posseme et al., "Residue growth on metallic-hard mask after dielectric etching in fluorocarbon-based plasmas. I. Mechanisms", Journal of Vacuum Science and Technology: Part B, vol. 28, No. 4, 2010, pp. 809-816.
Extended European Search Report issued on Dec. 13, 2021 in European Patent Application No. 21186810.4 (with Translation of Category of Cited Documents), 10 pages.

* cited by examiner

METHOD OF MAKING AN INDIVIDUALIZATION ZONE OF AN INTEGRATED CIRCUIT

TECHNICAL FIELD

The present invention relates to the individualization of integrated circuits. The invention has a particularly advantageous application in the protection of integrated circuits, components, or devices integrating such circuits.

PRIOR ART

The individualization of an integrated circuit in a component provides unique identification for that component. For example, this makes it possible to protect the component against attacks that emulate the functions that the component is supposed to perform.

In order to uniquely identify an integrated circuit, there are solutions aimed at using the functional dispersions inherent in integrated circuits. The resistances of the metal interconnection lines or of the vias differ from one circuit to the next, which induces voltage drops along the path followed by the electrical signal. The response time of signals therefore differs due to the induced variability of the propagation times of the signals at the limits of the circuit's electronic constraints, or due to the instability of the components at the time of booting, such as in the case of SRAMs (Static Random Access Memories), which have a unique state each time they are booted.

However, these solutions are very sensitive to environmental variations or aging. In particular, changes in temperature, power supply voltage, or electromagnetic interference can affect the performances of these solutions by diminishing their robustness. Consequently, the response times of an integrated circuit may change over time. The result is that a valid circuit may possibly be declared counterfeit.

As a result, there is a need to limit or even solve the problems of the known solutions.

SUMMARY

In order to achieve this objective, one embodiment calls for a method for making an individualization zone on a microchip, said microelectronic chip comprising at least the following:
  a first and a second level of electrical tracks,
  a level of interconnections located between the first and the second levels of electrical tracks and comprising vias intended to electrically connect the electrical tracks of the first level to the electrical tracks of the second level,
The method comprises at least the following steps carried out in the individualization zone of the chip:
  providing at least the first level of electrical tracks and at least a dielectric layer covering the first level,
  making a hard metal mask on the at least one dielectric layer having mask openings located at least in part at the electrical tracks and making the at least one dielectric layer accessible,
  etching the at least one dielectric layer through the mask openings by at least an etching based on fluorocarbon chemistry so as to form openings leading to the first level of electrical tracks,
  placing the hard metal mask in the presence of oxygen and moisture so as to form randomly distributed residues at certain openings, the openings then comprising openings with residues and openings without residues,
  filling the openings with an electrically conductive material so as to form at least the vias of the level of interconnections, said vias comprising functional vias at the openings without residues and inactive vias at the openings with residues.

In this way, the residues prevent the electrically conductive material from being properly deposited in certain openings, particularly by affecting the conformity of the deposit. These residues thus lead to the formation of defects, typically cavities, in certain vias or via holes and possibly also in certain electrical tracks of the second level.

The proposed method therefore makes it possible to deliberately, but randomly, degrade the level of interconnections and/or the second level of electrical tracks. This deliberate degradation makes it possible to create inactive via holes randomly distributed within the individualization zone of the chip. A via, also named via hole, may be made inactive by defects formed in the via hole and/or in the electrical track sitting above the via hole. The response curve of the chip or integrated circuit will therefore be closely tied to the random distribution of the inactive via holes. The response will therefore be unique. Each integrated circuit made using this method thus generates a different response. Furthermore, the response curve of the integrated circuit will be stable over time, contrary to the solutions described above in the prior art section.

It is difficult or even impossible to physically clone the individualization zone. It may be referred to using the acronym PUF (Physically Unclonable Function). It is therefore possible to make an integrated circuit including this individualization zone unique.

The method according to the invention thus proposes a reliable solution that can easily be implemented at a limited cost in order to make an individualization zone on an integrated circuit.

Another aspect concerns a method for making a microelectronic device including at least one integrated circuit, the integrated circuit comprising at least:
  a first and a second level of electrical tracks,
  a level of interconnections located between the first and the second levels of electrical tracks and comprising via holes intended to electrically connect tracks of the first level to tracks of the second level
  an individualization zone of the integrated circuit.

The individualization zone is made by implementing the method described earlier, preferably on only a portion of the integrated circuit.

Another aspect concerns a microelectronic device and a method for making a microelectronic device.

The microelectronic device includes at least one integrated circuit including at least one individualization zone and an unconnected functional zone, said zones comprising
  a first and a second level of electrical tracks,
  a level of interconnections located between the first and the second levels of electrical tracks and comprising via holes intended to electrically connect tracks of the first level to tracks of the second level, Advantageously, the functional zone essentially comprises functional via holes without defects, such as of metal oxide residues or cavities, and the individualization zone comprises inactive via holes with defects, such as metal oxide residues or cavities, the density of the inactive via holes in the individualization zone being at least 80% greater than the density of the inactive via holes in the functional zone.

The method for making such a device typically comprises the Implementation of the method for making an individualization zone described elsewhere on only a portion of the integrated circuit.

A microelectronic device is understood to be any type of device made using microelectronic means. In addition to devices for purely electronic purposes, these devices include micro- and nano-electromechanical systems (MEMS, NEMS, etc.) as well as micro-opto-electro-mechanical systems (MOEMS, etc.). It may be a device intended to perform an electronic, optical, mechanical, or other function. It may also be an intermediate product intended solely for the purpose of making another microelectronic device.

BRIEF DESCRIPTION OF THE FIGURES

The purpose and subject matter as well as the features and advantages of the invention will be better understood from the detailed description of an embodiment of the invention shown in the following accompanying drawings, in which.

The drawings are provided as examples and do not limit the invention. They are schematic representations intended to facilitate understanding of the invention and are not necessarily drawn to the scale of practical applications. In particular, the thicknesses of the various layers, via holes, patterns, and relief in the schematic drawings are not representative of reality.

DETAILED DESCRIPTION

Before entering into a detailed review of embodiments of the invention, optional features which may possibly be used in combination or as alternatives are given below:

According to one example, the openings have a minimal dimension $L_2$ of less than 90 nm and preferably of less than 70 nm. This minimal dimension $L_2$ typically corresponds to the critical dimension $CD_{via}$ of the via hole. This critical dimension is, for example, the diameter of the via hole taken along a slice parallel to the various levels of the integrated electrical tracks. An $L_2$ dimension of less than 70 nm increases the probability that a residue will generate a defect likely to render the via hole inactive. Such a defect may be a cavity.

According to one example, the hard metal mask is based on Ti or TiN or of TaN. The metal residues may be based on titanium oxide, $TiO_2$.

According to one example, the at least one etching is a plasma etching.

According to one example, placing the hard metal mask in the presence of oxygen and moisture is done by exposure to the presence of air, preferably for at least twelve hours and preferably for at least twenty-four hours.

According to one example, placing the hard metal mask in the presence of oxygen and moisture is done by exposing the hard metal mask to air.

According to another example, placing the hard metal mask in the presence of oxygen and moisture is done in an atmosphere that is richer in oxygen and/or moisture than air. This increases the kinetics of residue formation. According to one example, placing the hard metal mask in the presence of oxygen and moisture is done in an atmosphere having an oxygen and/or moisture content higher than the ambient air. This increases the kinetics of residue formation with water and air playing a catalyst role.

According to one example, placing the hard metal mask in the presence of oxygen and moisture is done at least in part by oxidation. According to one example, the oxidation is an oxidation by hydrolysis.

According to one example, the at least one etching is configured to make openings, each of which comprising a via hole opening and a track opening.

According to one example, the filling of the openings with an electrically conductive material is configured to form the via holes of the level of interconnections at said via hole openings, and to simultaneously form the electrical tracks of the second level at said track openings.

According to one example, the at least one etching comprises a first etching and a second etching intended to form the via hole openings and the track openings, respectively.

According to one example, the first etching is based on fluorocarbon chemistry such as $C_4F_6/N_2/Ar$.

According to one example, the second etching is based on $C_4F_8/N_2/Ar/O_2$ chemistry.

According to one example, the at least one dielectric layer comprises a layer based on dense SiOCH or porous SiOCH (p-SiOCH), or based on $SiO_2$.

According to one example, several via holes are associated with a same electrical track of the second level and with a same electrical track of the first level. This provides a nominal conductivity rate between these tracks that is a function of the rate of inactive via holes.

According to one example, the chip has at least one other zone, separate from the individualization zone, intended to form a functional zone of the chip.

According to one example, a protective mask is formed on said zone intended to form the functional zone prior to formation of the residues in the individualization zone.

The random inactive via holes are made only in the at least one individualization zone. The integrated circuit has at least one other zone, separate from the individualization zone, that is preferably intended to form a functional zone for the integrated circuit. This other zone typically has a larger surface area than the surface area of the individualization zone. In particular, the functional zone may have a surface area that is at least twice as large as that of the individualization zone. The first and the second levels of electrical tracks, as well as the level of interconnections, extend into said at least one other zone.

As part of the present invention, a so-called PUF individualization zone is perfectly differentiated from a functional zone intended, for example, to perform logical operations. As for the individualization zone, it primarily and preferably has the sole function of allowing for unique identification of the chip and therefore authentication of the chip. The individualization zone is accessible separately from the functional zone. The individualization zone is located in a well-delimited zone of the chip. For example, the individualization zone has a polygonal shape, such as that of a rectangle. In this way, not any defective zone can be assimilated to a PUF individualization zone. Likewise, not any non-defective zone can be assimilated to a functional zone.

In the present application, the terms "chip" and "integrated circuit" are used as synonyms.

Note that, in the context of this invention, the term via hole encompasses all electrical connections such as pads, lines, and conductive structures which run, preferably perpendicularly, between two layers of the integrated circuit, whether adjacent or not, that is, between two levels of electrical tracks. Each level of electrical tracks lies primarily in a plane and can include functional micromechanical structures such as transistors, for example. Preferably, each via hole forms a pad with a substantially circular cross-section.

Note that, in the context of this invention, the terms "on," "sits over," "covers," "underlying," "opposite," and equivalents thereof do not necessarily mean "in contact with." For example, the deposition, addition, bonding, assembly, or application of a first layer on a second layer does not necessarily mean that the two layers are directly in contact with one another, but does mean that the first layer covers the second layer at least in part by being either directly in contact therewith or by being separated therefrom by at least one other layer or at least one other element.

Furthermore, a layer may be composed of a plurality of sub-layers of a same material or of different materials.

A substrate, film, or layer "based" on a material A is understood to be a substrate, film, or layer comprising said material A, or this material A and possibly other materials, for example doping agents.

Several embodiments of the invention implementing successive steps of the manufacturing method are described below. Unless explicitly stated otherwise, the adjective "successive" does not necessarily mean that the steps immediately follow each other, even if that is generally the preferred meaning, and so there may be intermediate steps between them.

In addition, the term "step" refers to a portion of the method and may designate a set of sub-steps.

Furthermore, the term "step" does not necessarily means that the actions taken during a step are simultaneous or immediately follow each other. In particular, certain actions of a first step may be followed by actions associated with a different step, and other actions of the first step may be resumed later. Thus, the term step is not necessarily understood as unitary and inseparable actions over time and in the sequence of phases in the method.

The word "dielectric" refers to a material with an electrical conductivity that is low enough in the given application to be used as an insulator. In the present invention, a dielectric material preferably has a dielectric constant of less than 7.

"Selective etching with respect to" or "etching having a selectivity with respect to" is understood as an etching configured to remove a material A or a layer A with respect to a material B or a layer B, and having an etch rate of material A that is greater than the etch rate of material B. The selectivity is the ratio between the etch rate of material A to the etch rate of material B.

In the context of this invention, an organic material or organo-mineral material which can be shaped by exposure to a beam of electrons, photons, or X-rays, or mechanically, is considered a resin.

As an example, let us mention resins typically used in microelectronics, resins based on polystyrene (PS), methacrylate (for example Polymethyl MethAcrylate, PMMA), Hydrogen Silsesquioxane (HSQ), polyhydroxystyrene (PHS), and so on. The interest of using a resin is that it is easy to deposit a large thickness of it measuring several hundred nanometers to several microns.

Anti-reflective layers and/or coatings can be associated with the resins. In particular, this helps to improve the lithographic resolution. In the remainder of this document, the various resin-based masks are preferably associated with such anti-reflective layers.

In the present application, a hard metal mask is implemented. The mask is called "hard" for the sake of differentiating it from resin-based masks. A hard mask is perfectly clear to a person skilled in the art.

An orthonormal coordinate system comprising the x, y, and z axes is shown in the appended figures. When a single coordinate system is shown on the same plate of figures, the coordinate system applies to all the figures on the plate.

In the present patent application, the word thickness will preferably be used for a layer and the word depth for an etching. The thickness is measured in a direction perpendicular to the primary extension plane of the layer, and the depth is measured perpendicularly to the basal plane xy of the substrate. Thus, a layer typically has a thickness in the z direction, and an etching also has a depth in the z direction. The relative terms "on," "sits over," "below," and "underlying" refer to positions considered in the z direction.

An element located "above" or "at" another element means that the two elements are both on a same line perpendicular to a plane in which a lower or upper surface of a substrate extends, that is, on a same line oriented vertically in the figures.

Figure 1A:
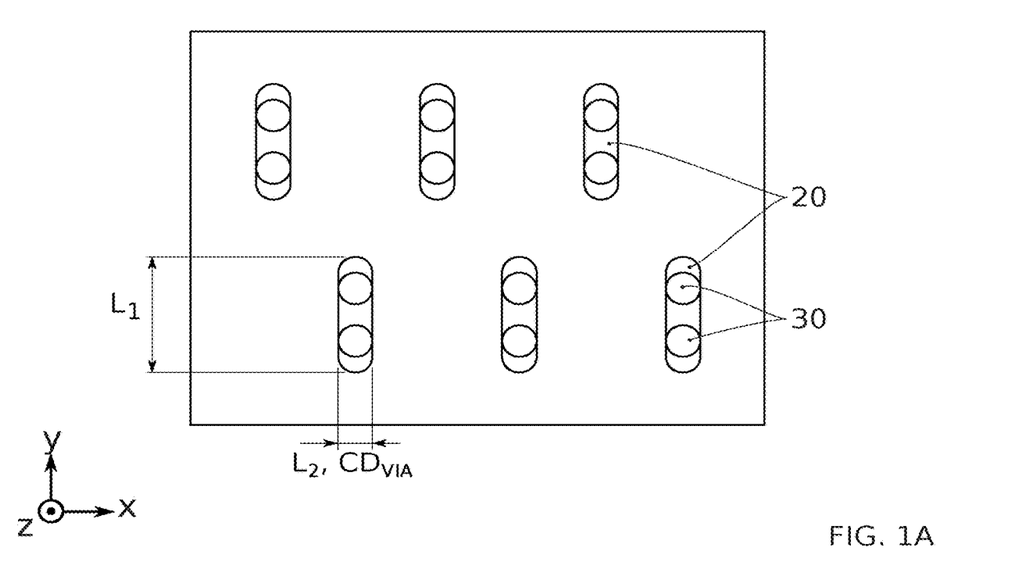
FIG. 1A shows a top view of a functional zone comprising electrical tracks of the second level, each of which associated with two underlying via holes, said via holes comprising functional via holes, according to one embodiment of the present invention.
Figure 1B:
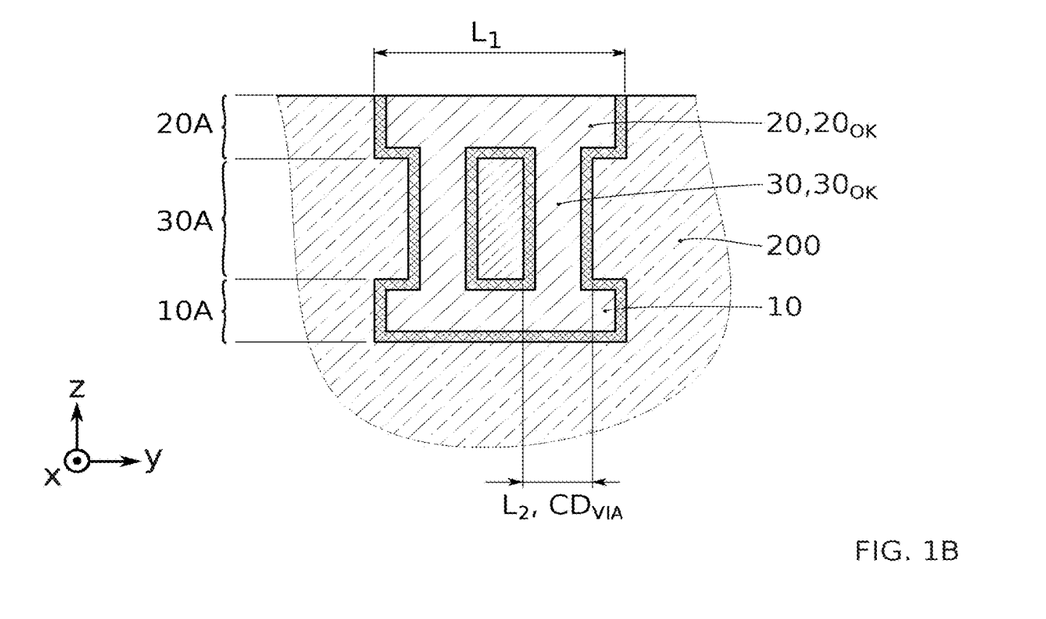
FIG. 1B shows a cross-section of an electrical track of the second level and an electrical track of the first level connected together by a functional via hole.

FIGS. 1A and 1B show schematic diagrams of a conventional integrated circuit comprising a first level 10A of electrical tracks 10, and a second level 20A of electrical tracks 20. Each of these levels 10A and 20A lies primarily along a plane xy. These planes are substantially parallel to each other and to a substrate, not shown, on which these first and second levels of electrical tracks 10A and 20A rest. The integrated circuit also comprises a level of interconnections 30A or conductor layer 30A configured to electrically connect tracks 10 of the first level 10A to tracks 20 of the second level 20A. This conductor layer 30A comprises conductive portions generally considered to be via holes 30. In addition, the various levels of electrical and conducting tracks are generally insulated from the other elements of the integrated circuit by at least one dielectric layer 200. Note that via holes 30 can connect tracks of two levels that are not directly adjacent but which are themselves separated by one or more other levels.

Figure 2A:
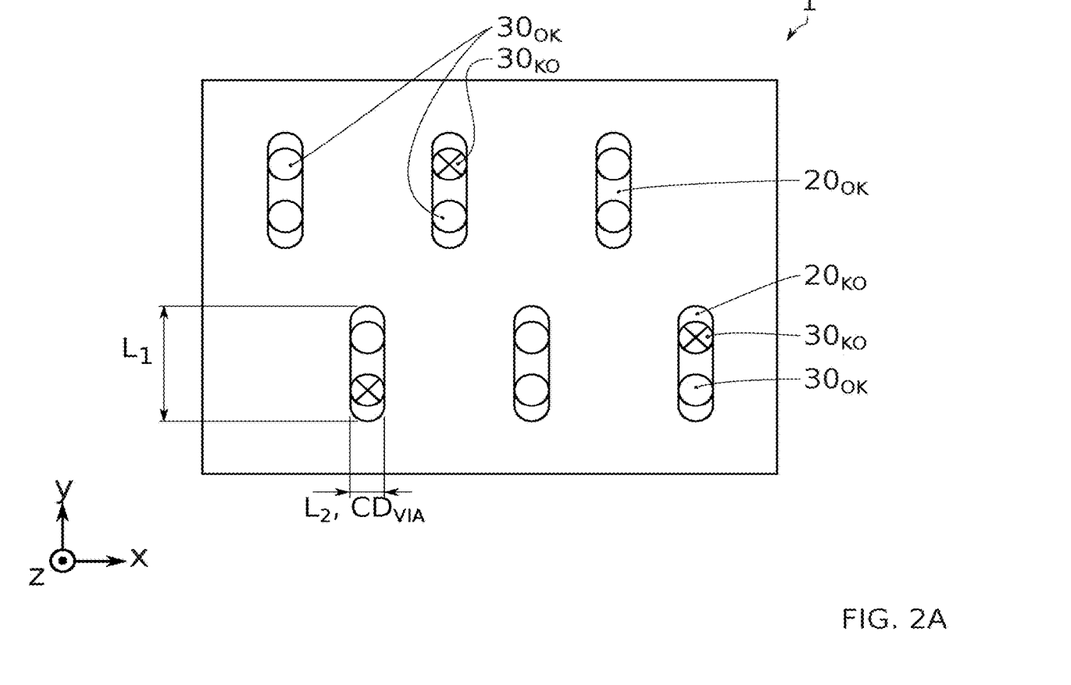
FIG. 2A shows a top view of an individualization zone comprising electrical tracks of the second level, each of which associated with two underlying via holes, said via holes comprising functional via holes and inactive via holes, according to one embodiment of the present invention.
Figure 2B:
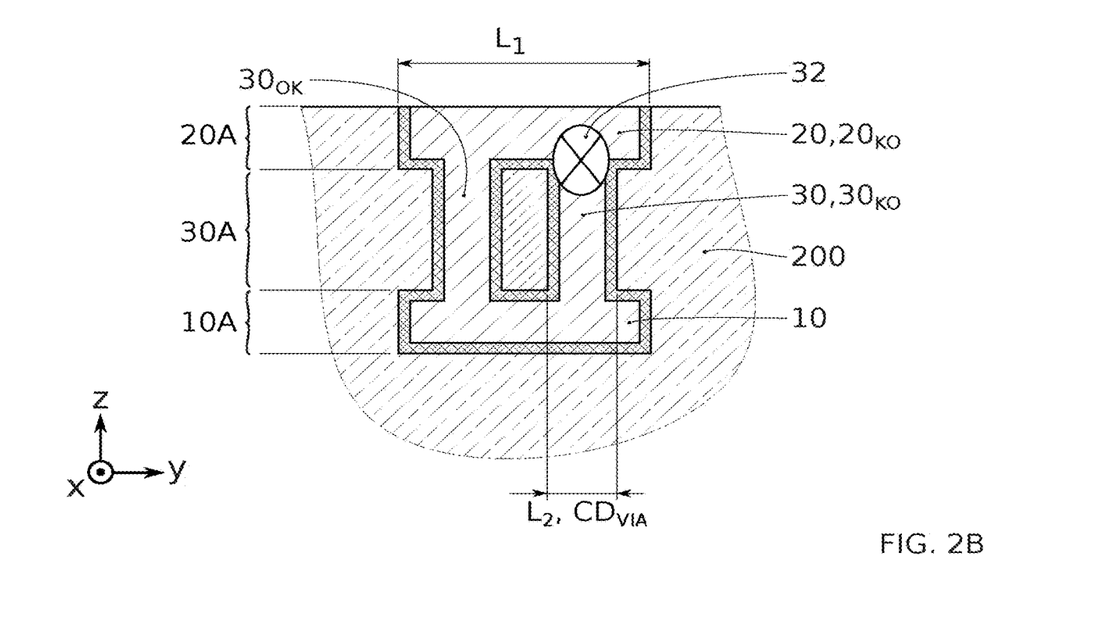
FIG. 2B shows a cross-section of an electrical track of the second level and an electrical track of the first level connected together by an inactive via hole, according to an embodiment of this invention.

A portion of the integrated circuit forms at least one functional zone 2 shown in FIGS. 1A and 1B, and another portion of the integrated circuit forms at least one individualization zone 1 shown in FIGS. 2A and 2B.

The functional zone 2 is intended to perform logical functions for the expected operation of the integrated circuit. The tracks 20, $20_{OK}$ of the second level 20A are typically defect-free. The via holes 30, $30_{OK}$ of the conductor layer 30A are also typically defect-free. Apart from the electrical tracks 10, 20, this functional zone 2 may comprise microelectronic structures such as, for example, transistors, diodes, MEMS, and so on.

As for the individualization zone 1, its function is to make each integrated circuit unique. To that end, and as detailed hereinbelow, the conductor layer and/or the second level of electrical tracks are randomly degraded during the manufacturing process so as to obtain inactive via holes $30_{KO}$. More specifically, defects 32 are randomly created in certain via holes 30 and/or certain tracks 20 so as to render these via holes $30_{KO}$ or these tracks $20_{KO}$ inactive.

A response curve of the integrated circuit is obtained by applying an electrical or logical test routine to the inputs (tracks 10 of the first level 10A, for example) of the individualization zone 1, and then by measuring the electrical or logical state at the output (tracks 20 of the second level 20A in this example) of the individualization zone 1. The principle is that for each integrated circuit there is an individualization zone 1 comprising a unique network of functional via holes $30_{OK}$ and inactive via holes $30_{KO}$. The response of each integrated circuit will therefore be different. Each integrated circuit may therefore be uniquely identified. The individualization zone 1 can be considered a PUF zone and the functional zone 2 can be considered a non-PUF zone.

According to the invention, the response curve of the integrated circuit depends on the number and position of the inactive via holes $30_{KO}$ in the individualization zone 1.

As shown schematically in FIG. 2A, the same electrical track 20 can be connected to a plurality of via holes 30, $30_{OK}$, $30_{KO}$. In particular, the individualization zone 1 may comprise electrical tracks $20_{OK}$ associated only with functional via holes $30_{OK}$, and/or electrical tracks $20_{KO}$ associated only with inactive via holes $30_{KO}$, and/or electrical tracks 20 associated both with functional via holes $30_{OK}$ and inactive via holes $30_{KO}$. This makes it possible to obtain a contact resistance in the electrical track 20, $20_{OK}$, $20_{KO}$ that varies as a function of the number of inactive via holes $30_{KO}$. In the illustrated case where two via holes 30 are associated with the same electrical track 20, this contact resistance can thus assume three different values. These values typically correspond to:
- about 0% nominal conductivity (two inactive via holes $30_{KO}$ per track $20_{KO}$),
- about 50% nominal conductivity (an inactive via hole $30_{KO}$ and a functional via hole $30_{OK}$ per track 20),
- about 100% nominal conductivity (two functional via holes $30_{OK}$ per track $20_{OK}$).

In the case (not shown) where three via holes 30 are associated with the same electrical track 20, this contact resistance can thus assume four different values. These values typically correspond to:
- about 0% nominal conductivity (three inactive via holes $30_{KO}$ per track $20_{KO}$),
- about 33% nominal conductivity (two inactive via holes $30_{KO}$ and a functional via hole $30_{OK}$ per track 20),
- about 66% nominal conductivity (an inactive via hole $30_{KO}$ and two functional via holes $30_{OK}$ per track 20),
- about 100% nominal conductivity (three functional via holes $30_{OK}$ per track $20_{OK}$).

By increasing the number of via holes 30 per track 20, the number of combinations of electrical conductivity states increases. This increases the number of possible response curves for the integrated circuit.

To make a via hole inactive, a defect 32—such as a cavity, for example—is deliberately created in the via hole 30 or between the via hole 30 and the track 20, as shown in FIG. 2A.

To that end, the method according to the invention randomly disrupts the filling of the via hole 30 and/or the track 20 with the conductive material.

FIGS. 3A to 3H show an embodiment example of this method as part of a technique for manufacturing via holes 30 and tracks 20 by simultaneously filling openings of via holes 303 and openings of tracks 302 with conductive material according to a so-called "dual damascene" method. The method is integrated into the manufacture of semiconductor components at the back-end level, that is, when the electrical conductor layers are being made.

Figure 3A:
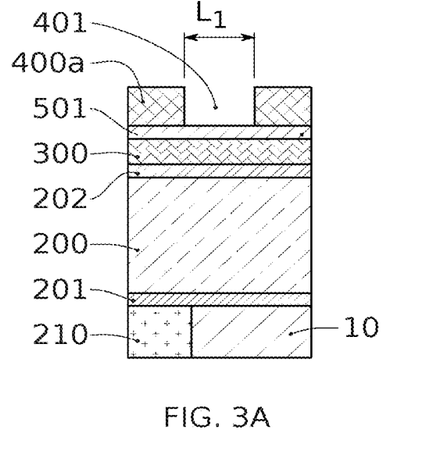
FIGS. 3A to 3H show steps in the making of an individualization zone of an integrated circuit according to the present invention.

FIG. 3A shows a cross-section of various layers stacked in the z direction, formed on the first level of tracks 10A in anticipation of the formation of the conductor layer 30A and the second level of tracks 20A.

The first level of tracks 10A comprises electrical tracks 10. These electrical tracks 10 are made in a conductive material such as copper; these electrical tracks 10 are typically encapsulated in a dielectric layer 210. This dielectric layer also serves the function of forming a barrier against diffusion of the copper. This dielectric layer 210 is made of $SiO_2$, for example.

Starting with the first level of tracks 10A, the stack of layers may comprise the following layers:
- Preferably an etch stop layer 201, for example based on SIGN. This SiCN layer 201 is typically applied by plasma-enhanced chemical vapor deposition (PECVD). It may have a thickness of less than 50 nm, preferably between 10 nm and 40 nm.
- A dielectric layer 200, such as a layer of silicon oxide doped with carbon, SiOCH. This SiOCH layer can be dense or porous (p-SiOCH), with, for example, a porosity on the order of 25%. It typically has a low dielectric constant such as on the order of 2.5. It can thus be considered a ULK (Ultra-Low k) layer. This SiOCH layer 200 can be deposited by PECVD or by centrifugation. It may have a thickness that is typically between 50 nm and 500 nm.

Optionally, a silicon oxide layer 202. This layer 202 can be deposited by PECVD. It may have a thickness that is on the order of 20 nm to 50 nm. It typically limits damage to the stack of dielectric layers during the subsequent planarization step by means of chemical-mechanical polishing, for example.

A hard metal mask 300. This hard metal mask 300 can be based on titanium, Ti, or titanium nitride, TiN, or tantalum nitride, TaN. It can be formed by physical vapor deposition (PVD). It typically has a thickness of between 15 nm and 50 nm.

The mask 300 has above it a first mask 400a having openings 401. These openings 401 of the mask 400a serve, in particular, to open the hard metal mask 300. The openings 401 are located at least in part at the electrical tracks 10. The openings 401 have an L1 dimension of between 50 nm and 500 nm. This L1 dimension corresponds to a characteristic dimension of the tracks 20 of the second level 20A. The first mask 400a makes it possible to define the tracks 20 of the second level 20A.

Depending on the technique implemented to open the mask 300, the mask 400a can be made of one or more layers. It can be based on a photosensitive resin, for example with a positive tone. A bottom anti-reflective coating (BARC) 501 is preferably placed between the hard metal mask 300 and the first mask 400a, as shown in FIG. 3A. The mask 400a made of photosensitive resin may have a thickness of between 50 nm and 300 nm. This thickness can be adjusted, for example, according to the level of metal addressed in the stack and consequently the resolution of the via holes. The anti-reflective coating 501 may have a thickness of between 25 nm and 35 nm, for example on the order of 30 nm.

Alternatively, the mask 400a may comprise two SOC (Spin On Carbon) and SiARC (silicon anti-reflective coating) layers, as well as a layer of photosensitive resin. The thicknesses of these three layers vary according to the type of products used and the dimensions of the via holes in question. They are typically on the order of 150 nm for SOC, 30 nm for SiARC, and about 100 nm for resin.

Preferably, the layers 501, 400a are deposited using a conventional spin coating method.

The openings 401 of the first mask 400a are made by implementing conventional lithography techniques such as optical lithography, electron beam (ebeam) lithography, nanoimprint lithography, or any other lithography technique known to a person skilled in the art.

Figure 3B:
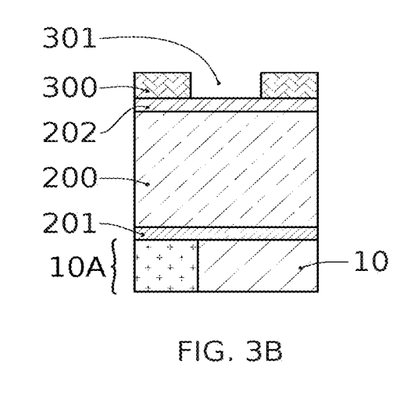

In order to obtain the result shown in FIG. 3B, a etching is performed in the hard metal mask 300 so as to transfer thereto the patterns 401 of the mask 400a. This etching is configured to form the mask openings 301.

The anti-reflective coating 501 and the hard metal mask 300 can be etched by plasma using chlorine-based etching chemistry, such as Cl2/BCl3. This type of plasma makes it possible to use a mask 400a based on resin with a thin thickness, for example less than 200 nm.

Figure 3C:
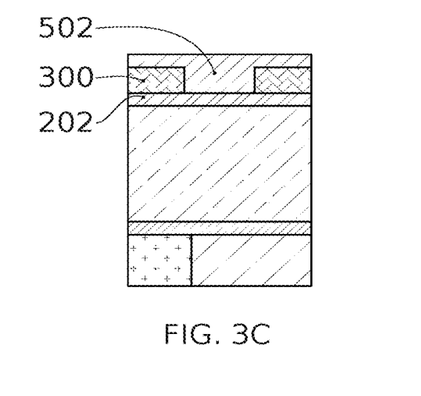
Figure 3D:
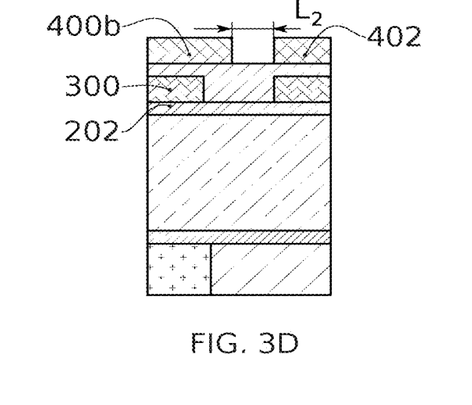

As shown in FIG. 3C, the mask openings 301 are then filled with BARC organic layer portions 502. A planarization step, for example by chemical-mechanical polishing (CMP), is preferably completed before depositing a second mask 400b (FIG. 3D).

This second mask 400b is typically resin-based. It has openings 402 located at least in part at the portions 502 and the electrical tracks 10. The openings 402 have an L2 dimension of between 20 nm and 100 nm, for example 70 nm. This L2 dimension corresponds to a characteristic dimension of the via holes 30 of the conductor layer 30A. The second mask 400a makes it possible to define the via holes 30 of the conductor layer 30A.

Figure 3E:
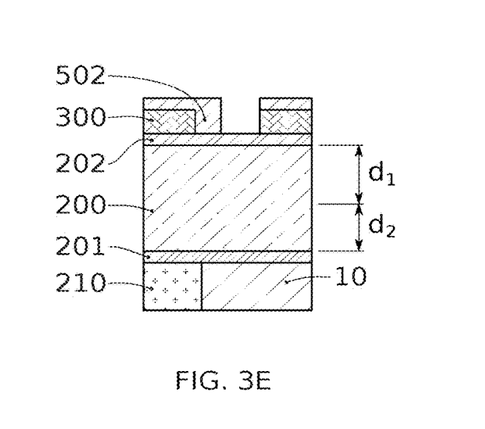

As shown in FIG. 3E, a first etching is performed to transfer the patterns 402 of the mask 400b to the dielectric layer 200 to a depth $d_1$. The depth $d_1$ can be between half and the entirety of the thickness of dielectric to be etching. The dielectric layer 200 ULK is thus partially etched. This first partial etching of the dielectric layer 200 ULK can be performed by fluorocarbon plasma, for example based on $C_4F_6/N_2/Ar$ chemistry. This first etching is preferably performed in a capacitively-coupled plasma (CCP) reactor.

Figure 3F:
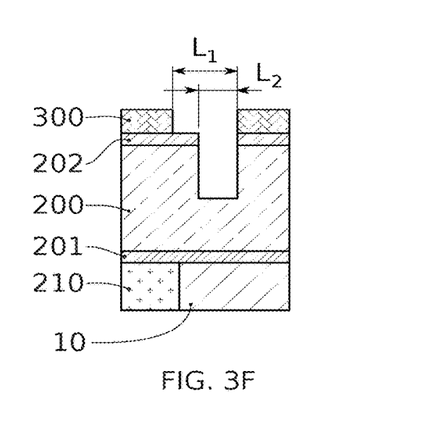

The mask 400b and the remaining portion 502 are then removed, such as by oxygen plasma (FIG. 3F). An opening pattern having the two dimensions $L_1$, $L_2$ is thus formed.

Figure 3G:
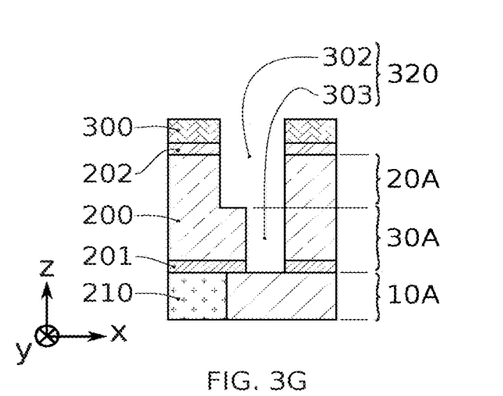

As shown in FIG. 3G, this opening pattern is transferred to the dielectric layer 200 ULK by a second etching. This makes it possible to simultaneously form a track opening 302 and a via hole opening 303 within the layer 200 ULK. The track openings 302 are intended to accommodate the tracks 20 of the second track level 20A. The via hole openings 303 are intended to accommodate the via holes 30 of the conductor layer 30A. This second etching is performed in the layer 200 ULK to a depth $d_2$, for example between 200 nm and 2 µm. The track openings 302 thus have a height $d_2$ and the via hole openings 303 thus have a height $d_1$. The etch stop layer 201 controls the stopping of this second etching. This second etching is preferably performed by fluorine plasma, for example based on $C_4F_8/N_2/Ar/O_2$ fluorocarbon chemistry The etch stop layer 201 also open upon completion of the second etching, for example by plasma based on $CH_3F/CF_4/N_2/Ar$ chemistry, so as to expose the tracks 10 of the first track level 10A.

Figure 3H:
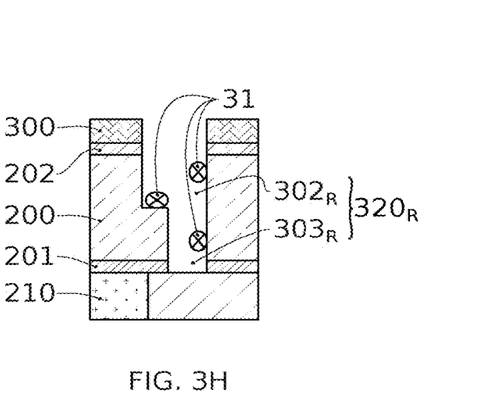

After formation of the openings 320 comprising the track openings 302 and the via hole openings 303, placement in the presence of moisture and oxygen (for example, by simply exposing to air) allows the residues 31 to form within the openings 320. Openings $320_R$ comprising residues 31, distributed, for example, in the track openings $302_R$ and/or in the via hole openings $303_R$, are thus obtained as shown in FIG. 3H. The residues 31 are typically based on metal oxide, more specifically based on an oxide of the metal material of the hard mask 400.

Exposure of the openings 320 to air may last several hours, for example at least 12 hours and preferably about 24 hours. In order to increase the kinetics of residue formation, an atmosphere richer in oxygen than the ambient air and/or more humid than the ambient air may be used. Indeed, water and oxygen play a role as catalyst for the reaction.

Figure 4A:
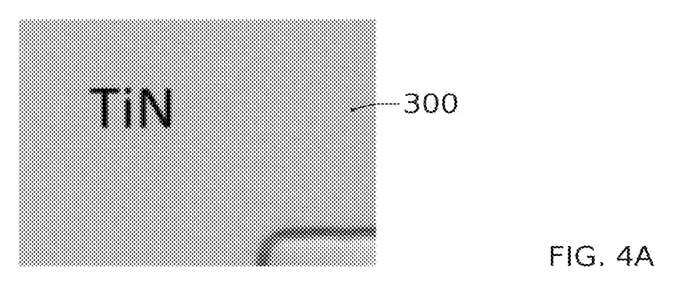
FIG. 4A is a top view of an electron microscope image of a hard metal mask before formation of the residues, according to an embodiment of the present invention.
Figure 4B:
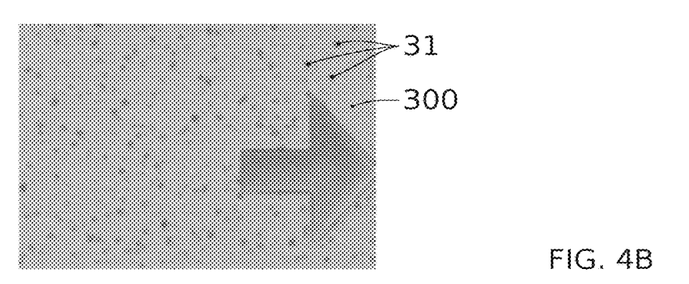
FIG. 4B is a top view of an electron microscope image of a hard metal mask after formation of the residues, according to an embodiment of the present invention.
Figure 5A:
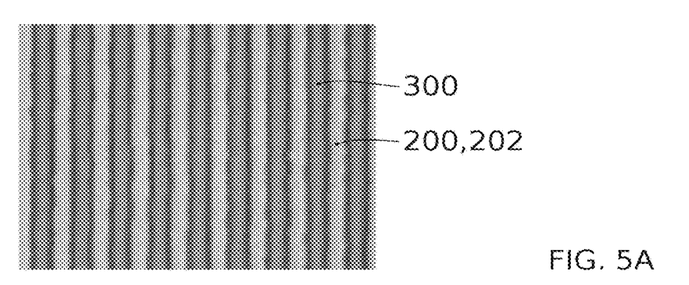
FIG. 5A is a top view of an electron microscope image of a hard metal mask before formation of the residues, according to another embodiment of the present invention.
Figure 5B:
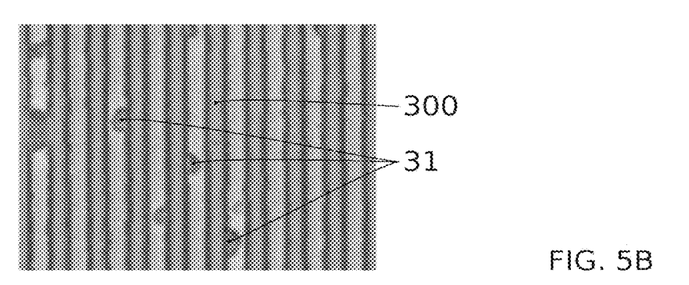
FIG. 5B is a top view of an electron microscope image of a hard metal mask after formation of the residues, according to another embodiment of the present invention.

FIGS. 4A and 5A show two images of two masks 300 based on TiN, right after the first and second fluorocarbon etchings have been performed. FIGS. 4B and 5B show two images of these same masks 300 based on TIN, after 24 hours of exposure to air. Numerous residues 31 are clearly visible in these FIGS. 4B and 5B. Advantageously, these residues are distributed randomly at the time of their formation, particularly within the openings 320.

The formation of the residues 31 does not depend on the nature of the dielectric layer 200. The formation of the residues 31 may depend on the rate of fluorine adsorbed on the surface of the hard metal mask 300. It may also depend on the relative humidity to which the hard metal mask 300 is exposed.

The use of fluorine or fluorocarbon chemistry for the first and second etchings of the layer 200 ULK advantageously makes it possible to form fluorinated metal compounds at the hard metal mask 300. A non-limiting example of a mechanism for the formation of these residues will now be described. In the case of a hard metal mask based on Ti, for example made of TiN, $TiF_3$ and $TiF_4$ compounds are formed on the exposed parts of the mask 300. After exposure to air, the $TiF_3$ and $TiF_4$ compounds are oxidized by hydrolysis in order to form TiOF species. Along the way, this formation releases fluorine in the form of HF. In turn, this release of HF promotes the formation of $TiF_6$ salt, which is hydrolyzed in the same way as the $TiF_3$ and $TiF_4$ compounds. The composition of the TiOF species is then enriched with oxygen so as to tend toward titanium oxides, $TiO_2$. The residues 31 are formed during this hydrolysis by aggregation of the oxidized species. Here, the residues 31 are primarily composed of $TiO_2$.

Refer to the document titled "Residue growth on metallic hard mask after dielectric etching in fluorocarbon-based plasmas. I. Mechanisms, N. Possemé et al., J. Vac. Sci. Technol. B, 28 (2010)" for further information on the mechanisms for forming these residues.

These residues 31 then prevent proper filling of the openings 320 by the conductive material—typically copper—forming the via holes 30 and/or the tracks 20. In particular, they can degrade the conformity of the deposition of the barrier layer 40 (shown in FIGS. 1B, 2B), the role of which is to avoid diffusion of the metal from the via holes or tracks into the dielectric layer 200. Defects 32 are thus created, typically cavities in the via holes 30 and/or the tracks 20. These defects 32 can occur during a subsequent planarization step, for example by CMP, after the openings 320 have been filled.

Figure 6:
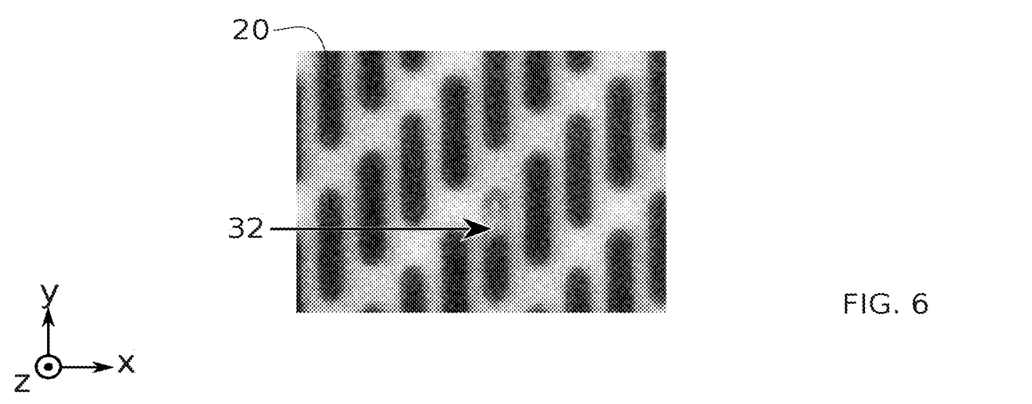
FIG. 6 is a top view of an electron microscope image of a zone comprising electrical tracks of the second level associated with underlying inactive via holes, according to an embodiment of the present invention.

FIG. 6 is a top-view image of tracks 20 in the individualization zone 1. A defect 32 in the form of a void or cavity obtained by the method described above is clearly visible.

Other embodiments of the method are obviously possible. In particular, the method can be implemented as part of a co-called "damascene" conventional manufacturing technique. In this case the openings 320 comprise only via hole openings 303 or only track openings 302.

Figure 7A:
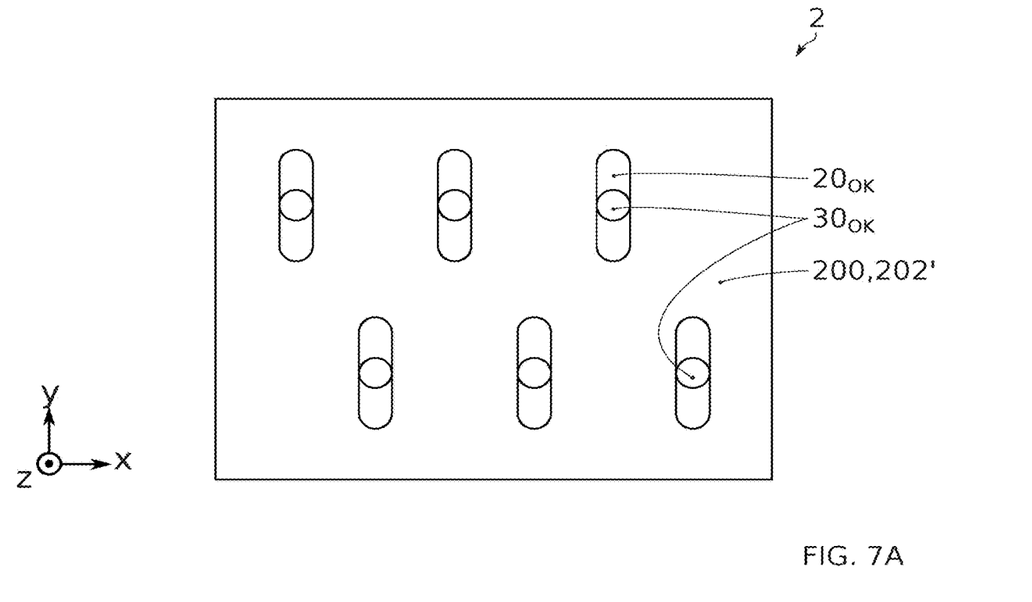
FIG. 7A shows a top view of a functional zone comprising electrical tracks of the second level, each of which associated with an underlying via hole, said via holes comprising functional via holes, according to an embodiment example of the present invention.
Figure 7B:
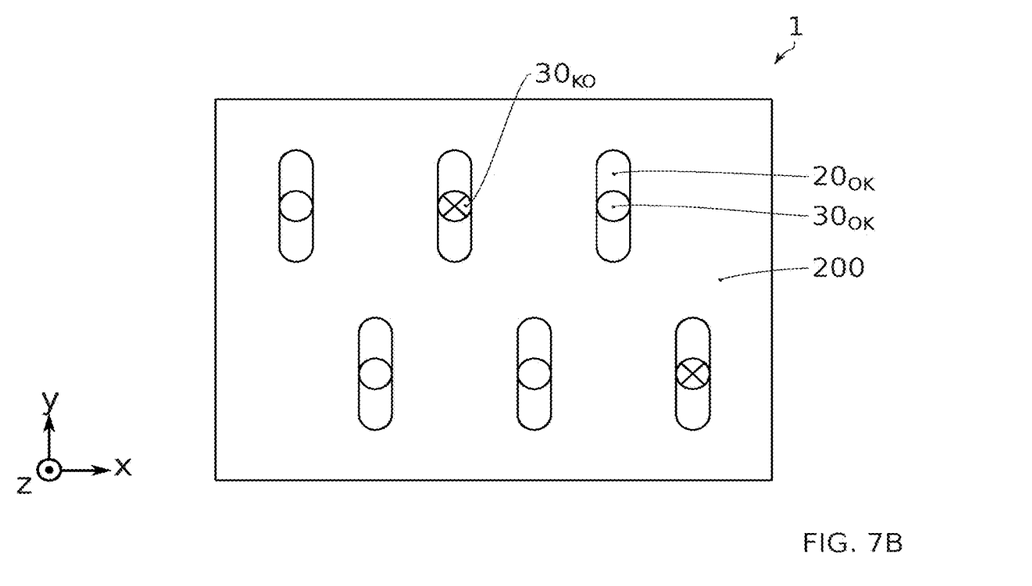
FIG. 7B shows a top view of an individualization zone comprising electrical tracks of the second level, each of which associated with an underlying via hole, said via holes comprising functional via holes and inactive via holes, according to an embodiment example of the present invention.

A single via hole 30 may be provided per track 20, as shown in FIGS. 7A, 7B. In this case, the conductivity by track 20 is binary: either the via hole 30 is a functional via hole $30_{OK}$ and the track has a nominal electrical conductivity (this is the case of the tracks 20 in the functional zone 2 shown in FIG. 7A), or the via hole 30 is an inactive via hole $30_{KO}$ and the track has no electrical conductivity (this is the case of certain tracks 20 in the individualization zone 1 shown in FIG. 7B). This makes it possible to simplify the design of the individualization zone 1. This makes it possible to simplify implementation of the method.

The invention is typically implemented to make an individualization zone 1 (PUF zone) in an integrated circuit further comprising a functional zone 2 (non-PUF zone). In this case, the method for making the individualization zone is only implemented on a portion of the integrated circuit.

FIGS. 8A to 8H show the fabrication of PUF and non-PUF zones on the same integrated circuit. In particular, FIGS. 8A, 8C, 8E, and 8G show steps performed in the non-PUF zone, and FIGS. 8B, 8D, 8F, and 8H show steps performed in parallel in the PUF zone.

Figure 8A:
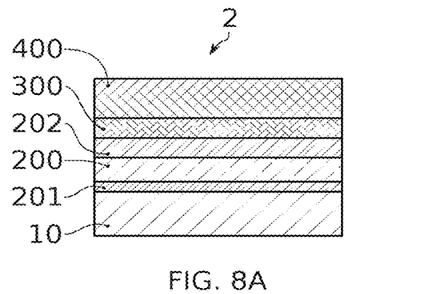
FIGS. 8A to 8H show steps in the manufacturing of an integrated circuit comprising at least one functional zone and an individualization zone, according to an embodiment example of the present invention.
Figure 8B:
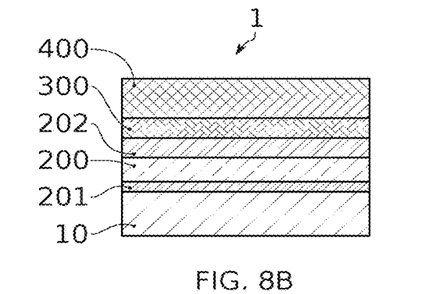
Figure 8C:
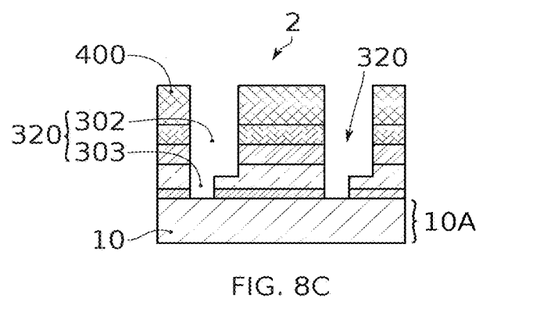
Figure 8D:
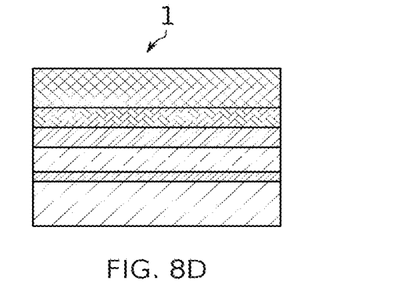

As shown in FIGS. 8A, 8B, the same stack comprising at least the first level of tracks 10, the dielectric layer 200, and the hard metal mask 300, is formed in the PUF and non-PUF zones.

The openings 320 for forming the via holes and/or the tracks of the second level are first formed in the non-PUF zone (FIG. 8C), while the PUF zone remains protected (FIG. 8D), typically by a protective mask. The protective mask can be based on resin 400 as shown, or it may be formed on the resin 400 intended for the lithography of the via holes and/or tracks of the second level (not shown).

Figure 8E:
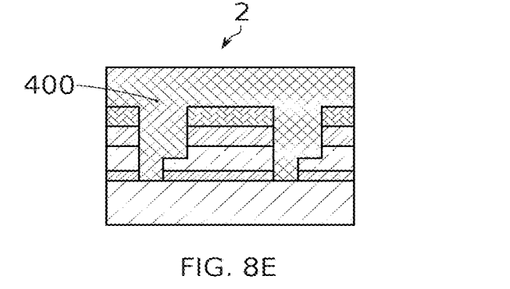
Figure 8F:
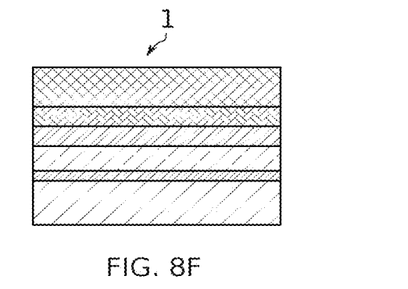
Figure 8G:
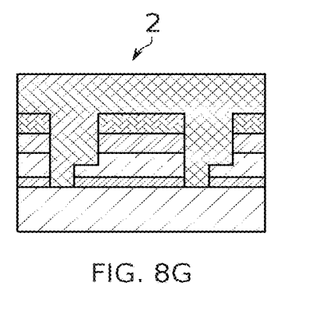

The openings 320 of the non-PUF zone are then protected, typically by filling with a resin 400 (FIG. 8E). The protective mask can then be removed from the PUF zone. The PUF zone is then ready for lithography of the via holes and/or the tracks of the second level (FIG. 8F).

The openings 320, $320_R$ for forming the via holes and/or the tracks of the second level are then formed in the PUF zone (FIG. 8H), while the non-PUF zone remains protected (FIG. 8G), typically by a protective mask or by the resin 400 filling the openings 320 of the non-PUF zone.

Figure 8H:
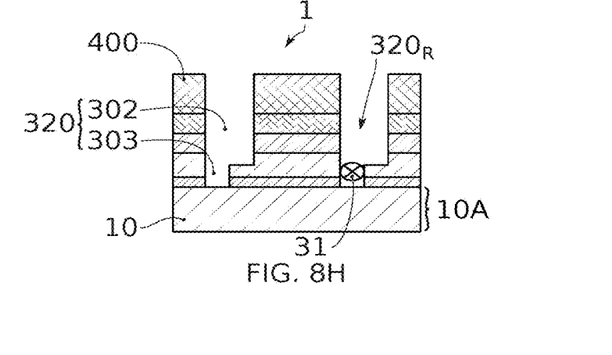

Residues 31 are then formed randomly in certain openings $320_R$ of the PUF zone, for example by exposure to air for a few hours (FIG. 8H).

The resin 400 of the PUF and non-PUF zones can then be removed, and the openings 320, $320_R$ of the PUF and non-PUF zones can be filled simultaneously with a conductive material so as to form functional via holes $30_{OK}$ and inactive via holes $30_{KO}$, as described in the method above.

In light of the foregoing description, it is clear that the proposed method offers a particularly effective solution for making a PUF individualization zone.

The invention is not limited to the embodiments described above and indeed extends to all the embodiments covered by the claims.

The embodiment described above is integrated into the manufacture of semiconducting compounds on the so-called "copper" back end. Nevertheless, the invention extends to embodiments using a conductive material other than copper. To that end, a person skilled in the art will know how to easily make the necessary adaptations in terms of the choice of materials and method steps.

The invention claimed is:

1. A method for making, in a microelectronic chip, an individualization zone that uniquely identifies the microelectronic chip, the microelectronic chip including a functional zone separate from the individualization zone, the individualization zone that results from the method including a first and a second level of electrical tracks, a level of interconnections located between the first and the second levels of electrical tracks and comprising vias to electrically connect electrical tracks of the first level to electrical tracks of the second level, the method comprising:
   providing the first level of electrical tracks and at least one dielectric layer covering the first level of electrical tracks,
   making a metal hard mask on the at least one dielectric layer, the metal hard mask having mask openings and making the at least one dielectric layer accessible,
   etching the at least one dielectric layer through the mask openings by at least one etching based on fluorocarbon chemistry so as to form a plurality of openings leading to the first level of electrical tracks,
   placing the metal hard mask in a presence of oxygen and moisture so as to form randomly distributed residues so that, as a result of the placing step, the plurality of openings include first openings with residues and second openings without residues,
   filling the plurality of openings with an electrically conductive material so as to form the vias of the level of interconnections, said vias comprising functional vias at the second openings without residues and inactive vias at the first openings with residues, and forming the second level of electrical tracks, wherein the method further comprises, prior to the formation of the residues in the individualization zone, forming a protective mask in the functional zone of the microelectronic chip so that the residues are not formed in functional zone.

2. The method according to claim 1, wherein the plurality of openings have a minimal dimension $L_2$ of less than 90 nm.

3. The method according to claim 1, wherein the placing step is performed by placing the metal hard mask in the presence of the oxygen and the moisture in an atmosphere having an oxygen and/or moisture content higher than that of ambient air.

4. The method according to claim 1, wherein the placing step is performed by placing the metal hard mask in the presence of the oxygen and the moisture by exposure to air.

5. The method according to claim 4, wherein the placing step is performed by placing the metal hard mask in the presence of the oxygen and the moisture by exposure to air for at least twelve hours.

6. The method according to claim 1, wherein the metal hard mask is based on Ti or TiN or TaN.

7. The method according to claim 1, wherein the at least one etching is a plasma etching.

8. The method according to claim 1, wherein the at least one etching is configured to form the plurality of openings, each of which comprises an opening for vias and an opening for tracks, and wherein the filling of said openings with an electrically conductive material is configured so as to form the vias of the level of interconnections at said via hole openings and to simultaneously form the electrical tracks of the second level at said track openings.

9. The method according to claim 8, wherein the at least one etching comprises a first etching and a second etching to form the vias openings and the track openings, respectively.

10. The method according to claim 1, wherein the at least one dielectric layer comprises a layer based on dense SiOCH or porous SiOCH (p-SiOCH), or based on $SiO_2$.

11. The method according to claim 1, wherein a plurality of the vias are associated with a same electrical track of the second level and a same electrical track of the first level.

* * * * *